United States Patent
Barsness et al.

(10) Patent No.: US 7,739,555 B2
(45) Date of Patent: Jun. 15, 2010

(54) AUTONOMICALLY ADJUSTING CONFIGURATION PARAMETERS FOR A SERVER WHEN A DIFFERENT SERVER FAILS

(75) Inventors: Eric Lawrence Barsness, Pine Island, MN (US); Mahdad Majd, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/173,381

(22) Filed: Jul. 15, 2008

(65) Prior Publication Data

US 2008/0276119 A1 Nov. 6, 2008

Related U.S. Application Data

(63) Continuation of application No. 11/149,490, filed on Jun. 9, 2005, now Pat. No. 7,464,303.

(51) Int. Cl.
*G06F 11/00* (2006.01)

(52) U.S. Cl. ...................................... 714/48

(58) Field of Classification Search .................. 714/48, 714/3, 4, 15, 18, 43
See application file for complete search history.

(56) References Cited

U.S. PATENT DOCUMENTS

| | | | | |
|---|---|---|---|---|
| 5,835,756 | A | * 11/1998 | Caccavale | ...................... 707/1 |
| 6,263,368 | B1 | 7/2001 | Martin | |
| 6,715,100 | B1 | * 3/2004 | Hwang | .......................... 714/5 |
| 2006/0047794 | A1 | * 3/2006 | Jezierski | ..................... 709/221 |

* cited by examiner

*Primary Examiner*—Nadeem Iqbal
(74) *Attorney, Agent, or Firm*—Martin & Associates, LLC

(57) ABSTRACT

A load balancer detects a server failure, and sends a failure notification message to the remaining servers. In response, one or more of the remaining servers may autonomically adjust their configuration parameters, thereby allowing the remaining servers to better handle the increased load caused by the server failure. One or more of the servers may also include a performance measurement mechanism that measures performance before and after an autonomic adjustment of the configuration parameters to determine whether and how much the autonomic adjustments improved the system performance. In this manner server computer systems may autonomically compensate for the failure of another server computer system that was sharing the workload.

16 Claims, 8 Drawing Sheets

AUTONOMICALLY ADJUSTING CONFIGURATION PARAMETERS FOR A SERVER WHEN A DIFFERENT SERVER FAILS

CROSS-REFERENCE TO PARENT APPLICATION

This patent application is a continuation of U.S. Ser. No. 11/149,490 filed on Jun. 9, 2005, which is incorporated herein by reference.

BACKGROUND OF THE INVENTION

1. Technical Field

This invention generally relates to networked computer systems, and more specifically relates mechanisms and methods for dealing with failure of a server in a networked computer system.

2. Background Art

The widespread proliferation of computers prompted the development of computer networks that allow computers to communicate with each other. With the introduction of the personal computer (PC), computing became accessible to large numbers of people. Networks for personal computers were developed that allow computers to communicate with each other.

Computer networks allow computer systems or programs known as "clients" to request information or services from other computer system or programs known as "servers". Different types of servers are know in the art. For example, a web server delivers, or "serves", a web page to a requesting client. An application server hosts software applications that may be invoked by client computer systems or programs. A database server delivers data in response to database requests (or queries) to a database. Note that these labels of "web server", "application server" and "database server" are used in the art to describe a specific function for a server, but these functions are not mutually exclusive. Thus, a single server could perform the functions of a web server, an application server, and a database server.

Often servers need high-availability, meaning that multiple servers are provided, and a failure in one server causes failover procedures to be followed to continue processing notwithstanding the failure. In such a scenario, a load balancer is typically used to distribute work to each of the servers. When a server goes down, the load balancer detects the failure and attempts to compensate by routing all of the requests to the remaining, non-failed servers. However, the remaining servers may not be able to handle the additional workload caused by the failure. As a result, the entire system slows down, potentially providing performance that is too slow to meet designed objectives or too slow to provide adequate customer response. Without a way for allowing server computer systems to better compensate for a failure of one of the servers, the computer industry will continue to suffer from reduced and potentially unacceptable performance when a server fails.

DISCLOSURE OF INVENTION

According to the preferred embodiments, a load balancer detects a server failure, and sends a failure notification message to the remaining servers. In response, one or more of the remaining servers may autonomically adjust their configuration parameters, thereby allowing the remaining servers to better handle the increased load caused by the server failure. One or more of the servers may also include a performance measurement mechanism that measures performance before and after an autonomic adjustment of the configuration parameters to determine whether and how much the autonomic adjustments improved the system performance. In this manner server computer systems may autonomically compensate for the failure of another server computer system that was sharing the workload.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to sharing requests among multiple server computers. For those not familiar with the sharing of requests among multiple server computers, this Overview section will provide background information that will help to understand the present invention.

Known Sharing Among Multiple Server Computers

Figure 1:
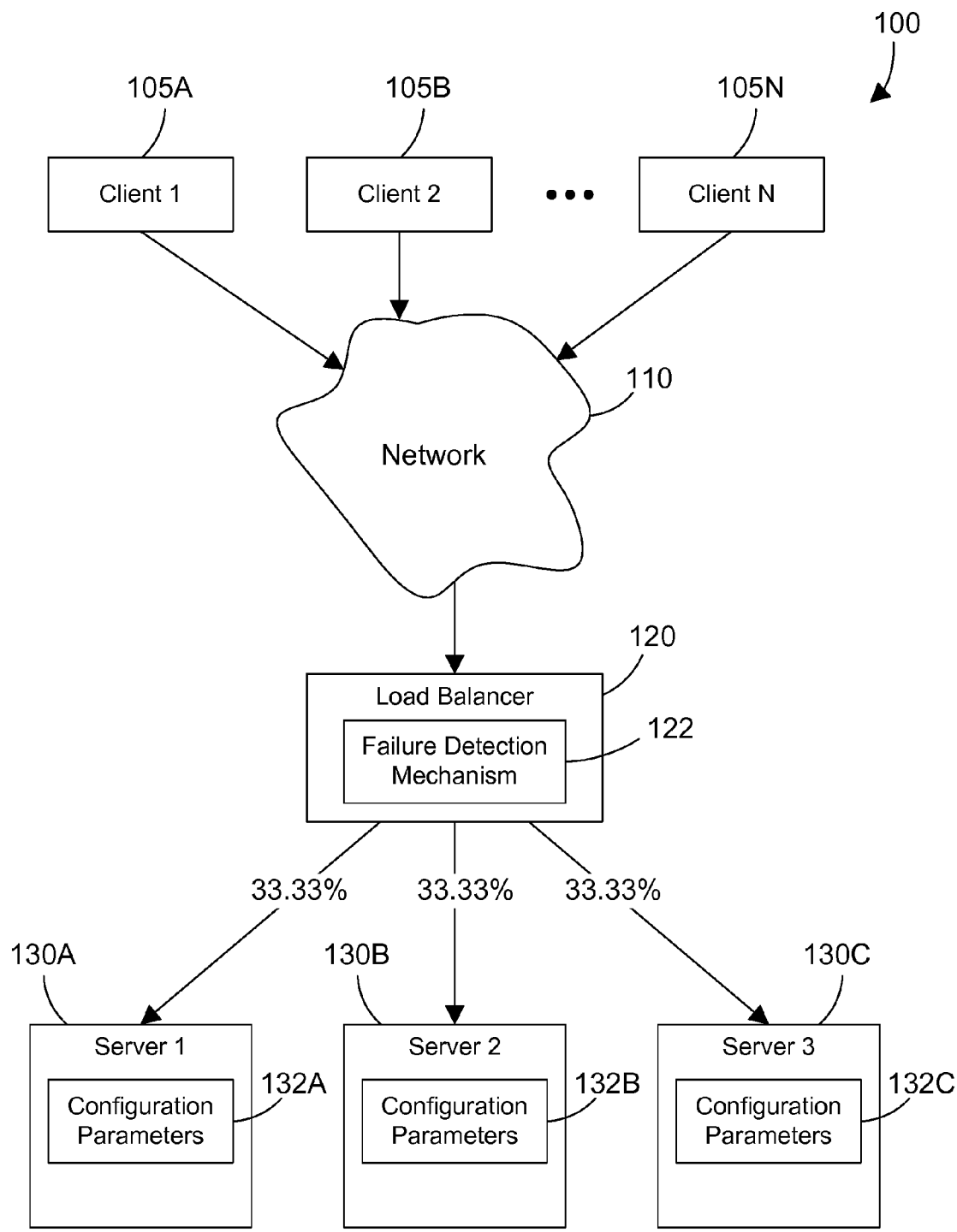
FIG. 1 is a block diagram of a prior art networked computer system showing three servers that share equally in the workload received by a load balancer.

Referring to FIG. 1, a sample prior art networked computer system 100 includes multiple clients 105 coupled to a network 110 that is coupled to a load balancer 120. Note that clients 105 are shown in FIG. 1 as 105A, 105B, ..., 105N. The load balancer 120 takes requests from the clients 105 via network 110, and routes these requests to one of three server computer systems 130, shown in FIG. 1 as 130A, 130B and 130C. The goal of load balancer 120 is to balance the load between the three server computer systems. We assume for this example that each server computer system has an identical configuration, thereby allowing each server to process an equal number of requests. In this scenario, the load balancer routes 33.33% of the requests to server 130A, routes 33.33% of the requests to server 130B, and routes 33.33% of the requests to server 130C.

Each server includes configuration parameters 132 that may be set to determine the run-time performance of the server. Thus, server 130A includes corresponding configuration parameters 132A; server 130B includes corresponding configuration parameters 132B; and server 130C includes corresponding configuration parameters 132C. These configuration parameters are preferably set by a system administrator to values that tune the performance of the servers to handle the anticipated load of requests each server needs to process under normal operation conditions, when all servers are functioning properly.

The configuration parameters may include a maximum number of database connections, a maximum number of prepared statements in a cache, and a maximum number of threads. The values for these configuration parameters are typically selected to optimize the performance of the server under normal operating conditions. Thus, for system 100 in FIG. 1, if each server computer system expects to need an average of 15 database connections, with 20 being required during peak load, the maximum number of database connections may be set to 20 for each of the three servers. Note that the specified number of database connections in the configuration parameters is tuned to a value that provides optimum performance when all three servers are working properly.

Figure 2:
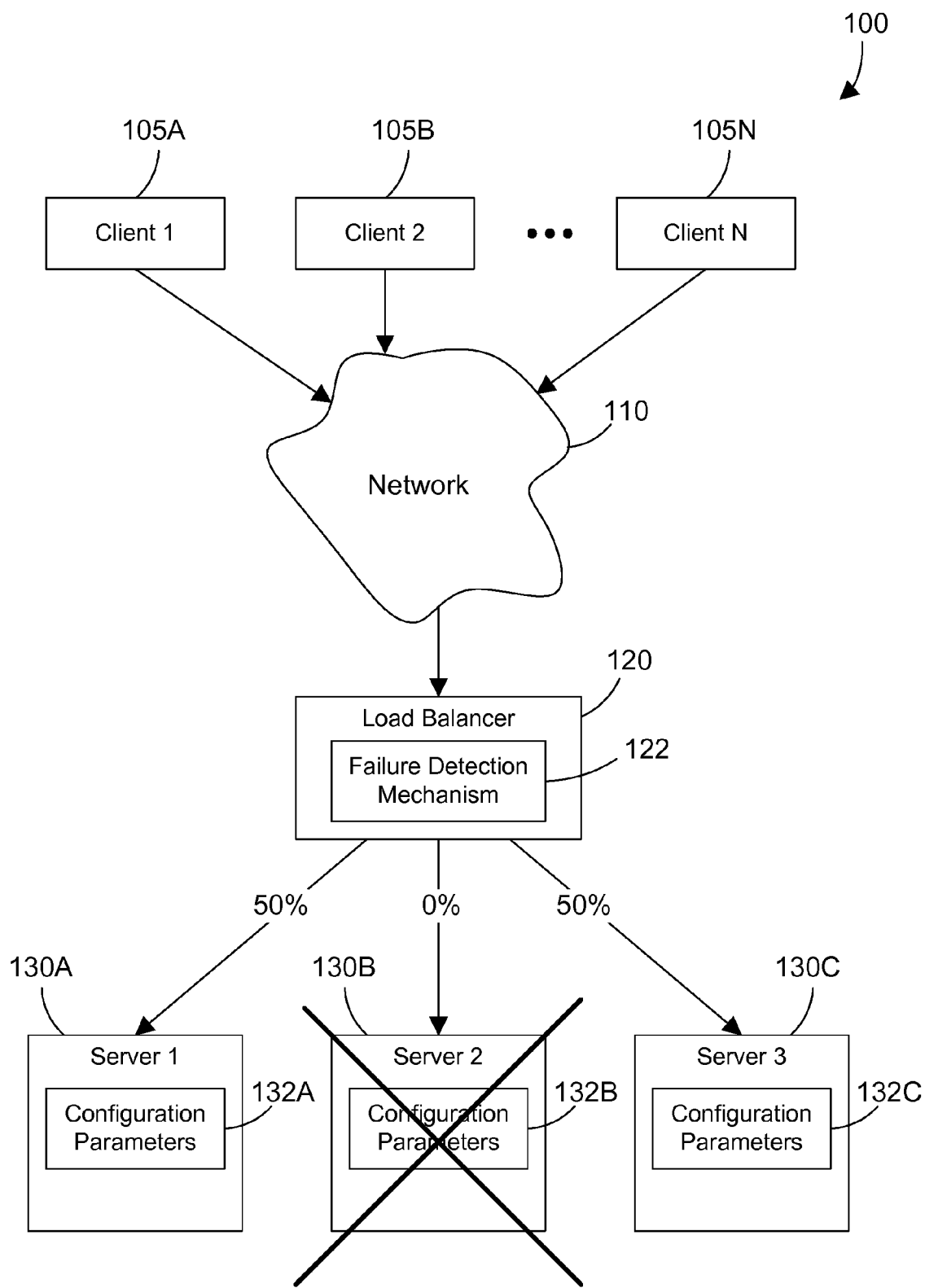
FIG. 2 is a block diagram of the prior art networked computer system in FIG. 1 after Server 2 fails, causing the load balancer to route all network traffic to the two remaining servers.

Now we assume that one of the servers fails, as shown in FIG. 2. We assume for this example that Server 130B fails. The load balancer 120 includes a failure detection mechanism 122 that detects when any of the servers fails. Once the failure detection mechanism 122 detects that server 120B has failed, the load balancer 120 must now route the requests to the two remaining servers 130A and 130C. The result is a substantial increase in requests to each remaining server. Because the three servers used to provide a total of 60 possible concurrent database connections, and now one of the three servers is down, the total of possible concurrent database connections is now reduced to 40 for the two remaining servers. The reduced total number of connections may make clients wait for some time before a database connection becomes available, thereby negatively impacting system performance and response time. As a result, although the load balancer can detect a server failure and route network requests to the remaining servers, the configuration parameters that were tuned for normal operation now inhibit the servers from efficiently handling the increased number of requests due to the failure of one of the servers.

2.0 Description of the Preferred Embodiments

The preferred embodiments detect when a server computer system fails, notifies the remaining server computer systems of the failure, thereby allowing one or more of the remaining computer system to autonomically adjust their configuration settings to new values that reflect a failure mode. The autonomic adjustment of configuration settings allows a server to dynamically adjust to the failure condition, thereby providing enhanced performance when a different server fails. In addition, the preferred embodiments measure the performance of a computer system before and after the autonomic adjustments to the configuration parameters, thereby determining to what degree, if any, the autonomic adjustments helped.

Figure 3:
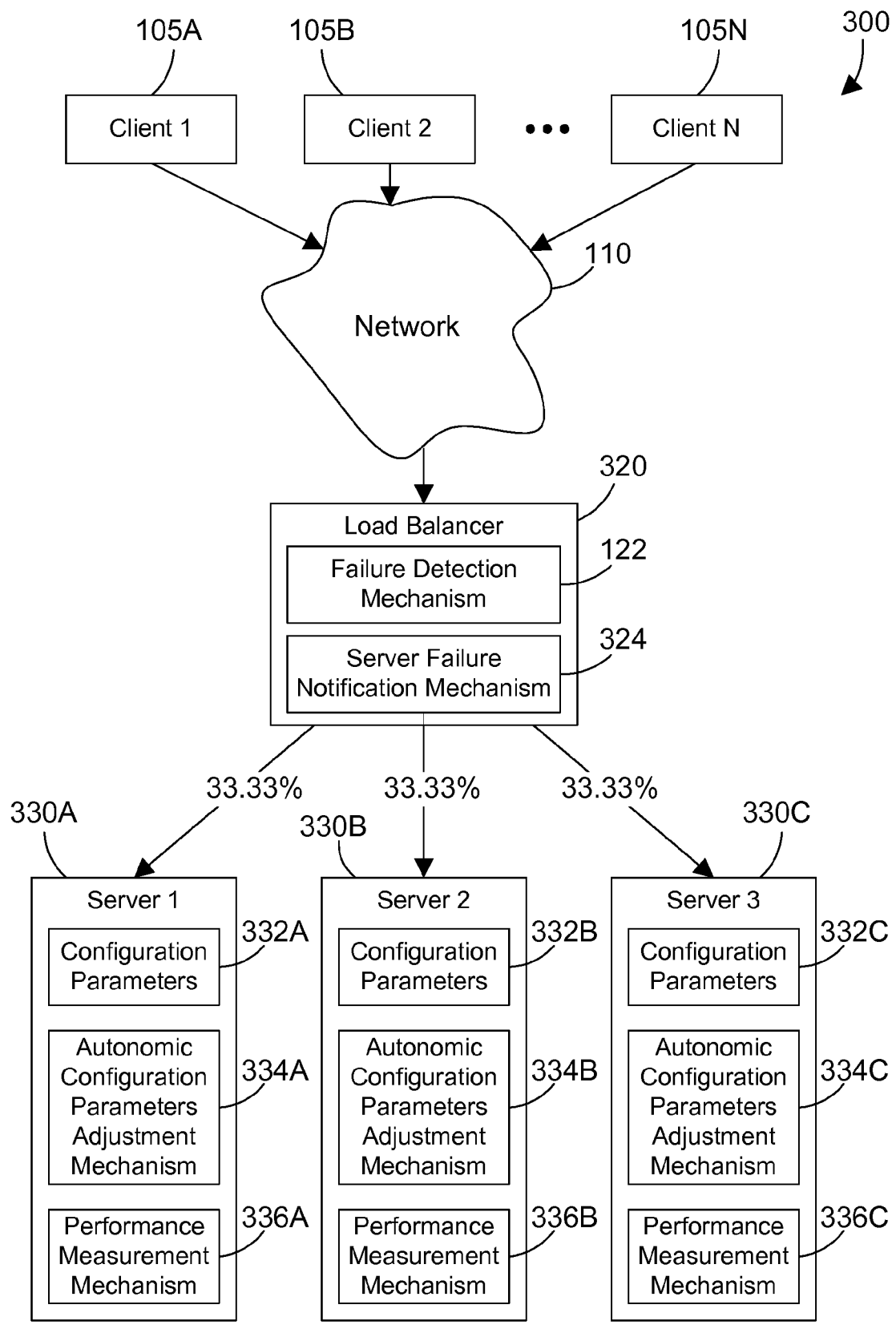
FIG. 3 is a block diagram of a networked computer system in accordance with the preferred embodiments.

Referring to FIG. 3, a networked computer system 300 in accordance with the preferred embodiments includes multiple clients 105 coupled to a network 110, which is coupled to a load balancer 320. The load balancer 320 performs the same load balancing function described above with respect to FIG. 1, routing 33.33% of the requests to each server computer system. Load balancer 320 includes a failure detection mechanism 122 as described above, and additionally includes a server failure notification mechanism 324. The server failure notification mechanism 324 sends out a message to each non-failed server when the failure detection mechanism 122 detects that one of the servers has failed.

One or more of the server computer systems 330 includes configuration parameters 332. As used herein, the term "server" is used broadly to apply to any computer system that may be invoked by a client computer system or client program. The configuration parameters 332 may include the prior art configuration parameters described above, and may include other configuration parameters that may be set to different values that affect the performance of the server. One or more of the server computer system 330 may additionally include an autonomic configuration parameters adjustment mechanism 334, and a performance measurement mechanism 336. In system 300 in FIG. 3, each server computer system is shown to include corresponding configuration parameters 332, autonomic configuration parameters adjustment mechanism 334, and performance measurement mechanism 336. Thus, server 330A includes corresponding configuration parameters 332A, an autonomic configuration parameters adjustment mechanism 334A, and a performance measurement mechanism 336A. Server 330B includes corresponding configuration parameters 332B, an autonomic configuration parameters adjustment mechanism 334B, and a performance measurement mechanism 336B. Server 330C includes corresponding configuration parameters 332C, an autonomic configuration parameters adjustment mechanism 334C, and a performance measurement mechanism 336C.

Figure 4:
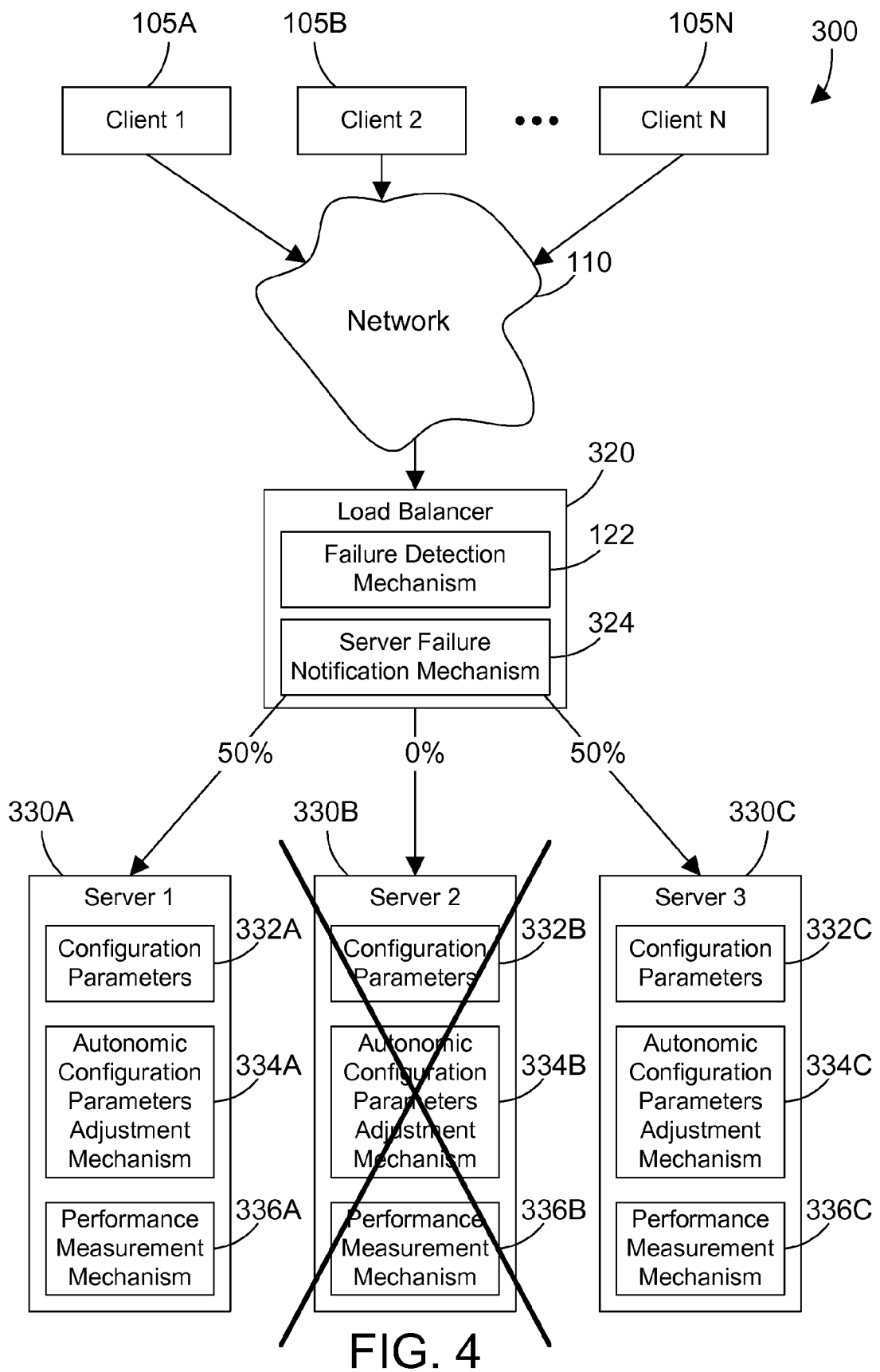
FIG. 4 is a block diagram of the networked computer system in FIG. 3 after Server 2 fails, causing the load balancer to signal a failure to the two remaining servers and routing all network traffic to the two remaining servers.

Now we assume that Server 330B fails, as shown in FIG. 4. The failure detection mechanism 122 detects the failure, and routes all requests to the two remaining servers 330A and 330C. In addition, the server failure notification mechanism 324 sends a message to server 330A and server 330C indicating that a server has failed. The message may simply indicate the number of servers that failed, or may instead specifically identify which server(s) failed. In addition, the message may also specify how much additional work the server may expect. Since the load balancer 320 is directing the work to the servers, it knows how much work was being done by the failed server, and how many remaining servers there are, and therefore how much work will be added to each remaining server. Once server 330A receives the message from the server failure notification mechanism 324 that a server failed, or that server 330B failed, the autonomic configuration parameters adjustment mechanism 334A autonomically adjusts one or more of the configuration parameters 332A to levels that allow more efficient processing due to the failure of server 330B. Likewise, once server 330C receives the message from the server failure notification mechanism 324 that a server failed, or that server 330B failed, the autonomic configuration parameters adjustment mechanism 334C autonomically adjusts one or more of the configuration parameters 332C to levels that allow more efficient processing due to the failure of server 330B. In this manner, the load balancer 320 may signal to the non-failed servers that a server has failed, thereby allowing the non-failed servers to autonomically adjust their configuration parameters to more efficiently function in the failure environment. The load balancer 320 also includes a mechanism that detects when server 330B or a replacement server comes back online, and sends a message to the other servers indicating that the failure has gone away. In response, the autonomic configuration parameters adjustment mechanisms may re-adjust the configuration parameters back to their normal operating values.

Figure 5:
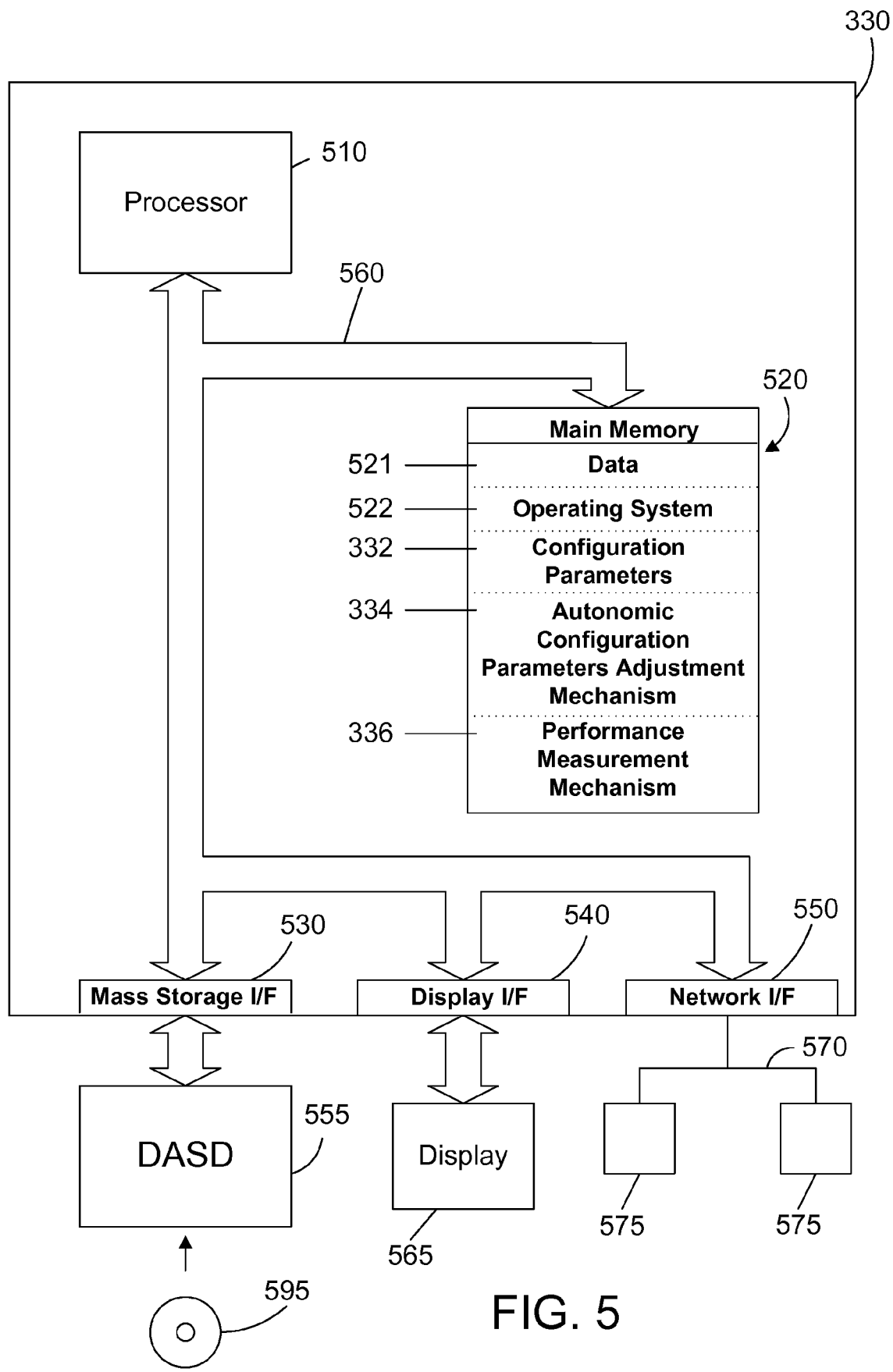
FIG. 5 is a block diagram of an apparatus in accordance with the preferred embodiments.

Referring to FIG. 1, a computer system 330 is one suitable implementation of an apparatus in accordance with the preferred embodiments of the invention. Computer system 330 is an IBM eServer iSeries computer system, and represents one specific implementation for a server computer system 330 shown in FIGS. 3 and 4. Those skilled in the art will appreciate that the mechanisms and apparatus of the present invention apply equally to any computer system, regardless of whether the computer system is a complicated multi-user computing apparatus, a single user workstation, or an embedded control system. As shown in FIG. 5, computer system 330 comprises a processor 510, a main memory 520, a mass storage interface 530, a display interface 540, and a network interface 550. These system components are interconnected through the use of a system bus 560. Mass storage interface 530 is used to connect mass storage devices, such as a direct access storage device 555, to computer system 330. One specific type of direct access storage device 555 is a readable and writable CD RW drive, which may store data to and read data from a CD RW 595.

Main memory 520 in accordance with the preferred embodiments contains data 521, an operating system 522, configuration parameters 332, an autonomic configuration parameters adjustment mechanism 334, and a performance measurement mechanism 336. Data 521 represents any data that serves as input to or output from any program in computer system 330. Operating system 522 is a multitasking operating system known in the industry as OS/400; however, those skilled in the art will appreciate that the spirit and scope of the present invention is not limited to any one operating system. Configuration parameters 332 represent any parameter in the server computer system 330 that may be set to different values to tune the performance of the server computer system 330. Configuration parameters 332 include a maximum number of database connections, a maximum number or prepared statements in a cache, and a maximum number of threads. Of course, configuration parameters 332 may include any other suitable parameter that may be set or changed to affect the performance of the computer system 330.

The autonomic configuration parameters adjustment mechanism 334 autonomically adjusts the configuration parameters 332 to failure values that allow the server 330 to function more efficiently when a different server fails. In addition, the autonomic configuration parameters adjustment mechanism 334 autonomically adjusts the configuration parameters back to normal levels once a server recover is detected. The performance measurement mechanism 336 measures performance of the computer system after a failure and before the autonomic configuration parameters adjustment mechanism 334 makes the adjustment to the configuration parameters 332, then after the autonomic configuration parameters adjustment mechanism 334 makes the adjustment to the configuration parameters 332. By comparing the before and after performance values, the performance measurement mechanism 336 may determine how effective the adjustments to the configuration parameters were in improving the performance of the computer system 330. If the improvement was not satisfactory, other values for the configuration parameters may be tried in attempt to improve the performance more.

Computer system 330 utilizes well known virtual addressing mechanisms that allow the programs of computer system 330 to behave as if they only have access to a large, single storage entity instead of access to multiple, smaller storage entities such as main memory 520 and DASD device 555. Therefore, while data 521, operating system 522, configuration parameters 332, autonomic configuration parameters adjustment mechanism 334, and performance measurement mechanism 336 are shown to reside in main memory 520, those skilled in the art will recognize that these items are not necessarily all completely contained in main memory 520 at the same time. It should also be noted that the term "memory" is used herein to generically refer to the entire virtual memory of computer system 330, and may include the virtual memory of other computer systems coupled to computer system 330.

Processor 510 may be constructed from one or more microprocessors and/or integrated circuits. Processor 510 executes program instructions stored in main memory 520. Main memory 520 stores programs and data that processor 510 may access. When computer system 330 starts up, processor 510 initially executes the program instructions that make up operating system 522. Operating system 522 is a sophisticated program that manages the resources of computer system 330. Some of these resources are processor 510, main memory 520, mass storage interface 530, display interface 540, network interface 550, and system bus 560.

Although computer system 330 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 510. However, those skilled in the art will appreciate that the present invention applies equally to computer systems that simply use I/O adapters to perform similar functions.

Display interface 540 is used to directly connect one or more displays 565 to computer system 330. These displays 565, which may be non-intelligent (i.e., dumb) terminals or fully programmable workstations, are used to allow system administrators and users to communicate with computer system 330. Note, however, that while display interface 540 is provided to support communication with one or more displays 565, computer system 330 does not necessarily require a display 565, because all needed interaction with users and other processes may occur via network interface 550.

Network interface 550 is used to connect other computer systems and/or workstations (e.g., 575 in FIG. 1) to computer system 330 across a network 570. The present invention applies equally no matter how computer system 330 may be connected to other computer systems and/or workstations, regardless of whether the network connection 570 is made using present-day analog and/or digital techniques or via some networking mechanism of the future. In addition, many different network protocols can be used to implement a network. These protocols are specialized computer programs that allow computers to communicate across network 570. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 595 of FIG. 1), and transmission type media such as digital and analog communications links. Note that the preferred signal bearing media is tangible.

Figure 6:
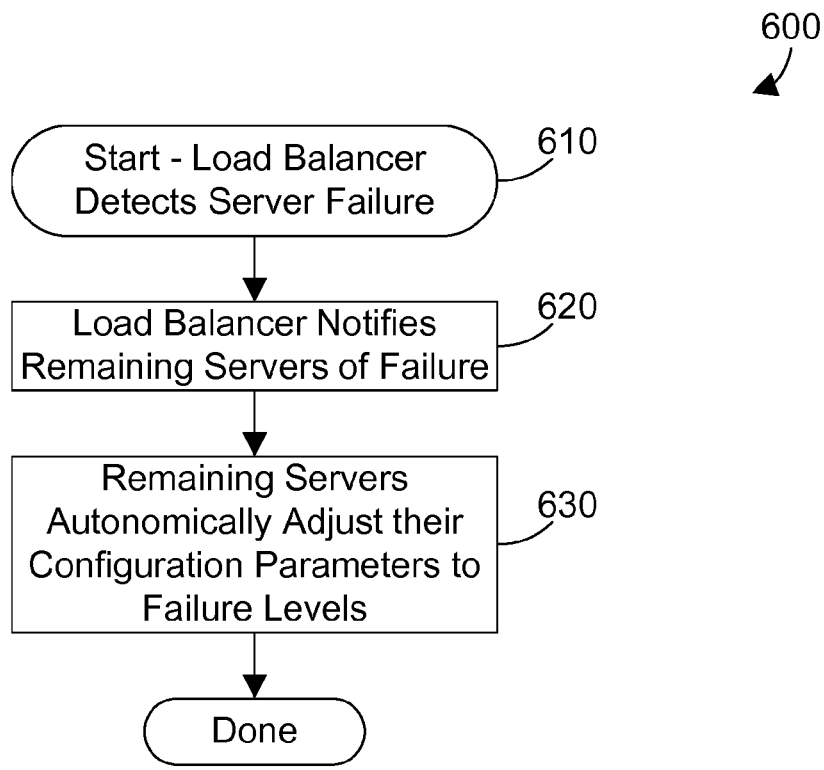
FIG. 6 is a flow diagram of a method in accordance with the preferred embodiments when a load balancer detects a server failure.

Referring now to FIG. 6, a method 600 begins when the load balancer detects a server failure (step 610). The load balancer notifies the remaining servers of the failure (step 620), preferably by sending a message to the remaining servers. One or more of the remaining servers then autonomically adjust their configuration parameters to failure levels (step 630). In the preferred embodiments, there are two different sets of configuration parameters that are defined, one for normal operation and one for failure operation. Configuration parameters are set to "failure levels" by setting the configuration parameters to the values defined for failure operation. Likewise, configuration parameters are set to "normal levels" by setting the configuration parameters to the values defined for normal operation. Method 600 shows how a failure in a server may be detected, and in response thereto, the configuration parameters for one or more remaining servers may be autonomically adjusted (or set) to failure levels so the remaining servers may handle the increased load more effectively than if the configuration parameters were left at normal levels.

Figure 7:
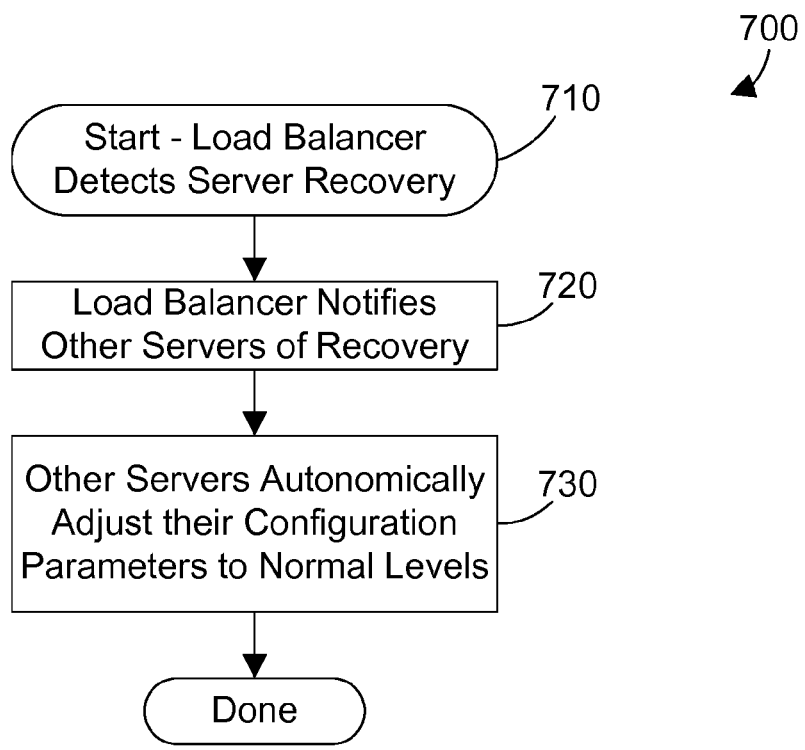
FIG. 7 is a flow diagram of a method in accordance with the preferred embodiments when the load balancer detects a server recovery.
Figure 8:
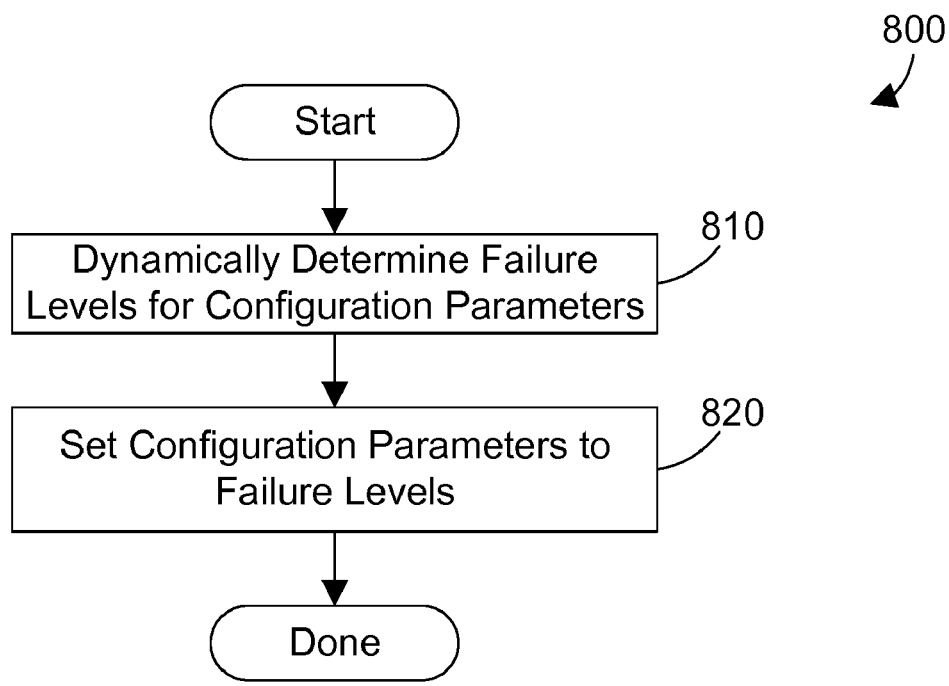
FIG. 8 is a flow diagram of a method in accordance with the preferred embodiments for dynamically determining failure levels for configuration parameters, and setting the configuration parameters for a server to the failure levels when a failure occurs.

Referring to FIG. 7, a method 700 begins when the load balancer detects a server recovery (step 710). The load balancer notifies the other servers of the recovery (step 720), preferably by sending a message to the remaining servers. One or more of the other servers then autonomically adjusts their configuration parameters back to normal levels (step 730). Method 700 shows how a recovery may be detected, and in response thereto, the configuration parameters for one or more remaining servers may be autonomically adjusted (or set) to normal levels.

The preferred embodiments include two different methods for defining failure levels for configuration parameters. A first method allows the server to dynamically determine appropriate failure levels for the configuration parameters (step 810). Once these failure levels are dynamically determined, the configuration parameters for the server may be set to these failure levels (step 820). Note that the dynamic determination of appropriate failure levels in step 810 may be done using any suitable algorithm or heuristic. For example, in the simple example shown in FIGS. 3 and 4, one suitable way to dynamically determine appropriate failure values for the configuration parameters is to apply a linear scaling factor. In this example, if the three servers each have a maximum of 20 database connections, when server 330B fails, the load balancer 320 knows that ⅓ of the capacity to process requests has been lost. As a result, the message to each remaining server 330A and 330C could include an indication that each server's load will increase by 50%. In response, the remaining servers 330A and 330C could increase their maximum 20 database connections by 50% to 30 database connections each. In another example, each server could look at available processor or I/O bandwidth to determine an appropriate adjustment to the configuration parameters to handle the increased load specified by the load balancer in the message. The preferred embodiments expressly apply to any and all ways and methods for dynamically determining failure levels for the configuration parameters for one or more servers. Note that the dynamically determined failure levels may be performed before a failure occurs, with the failure levels stored for future use when a failure occurs.

Figure 9:
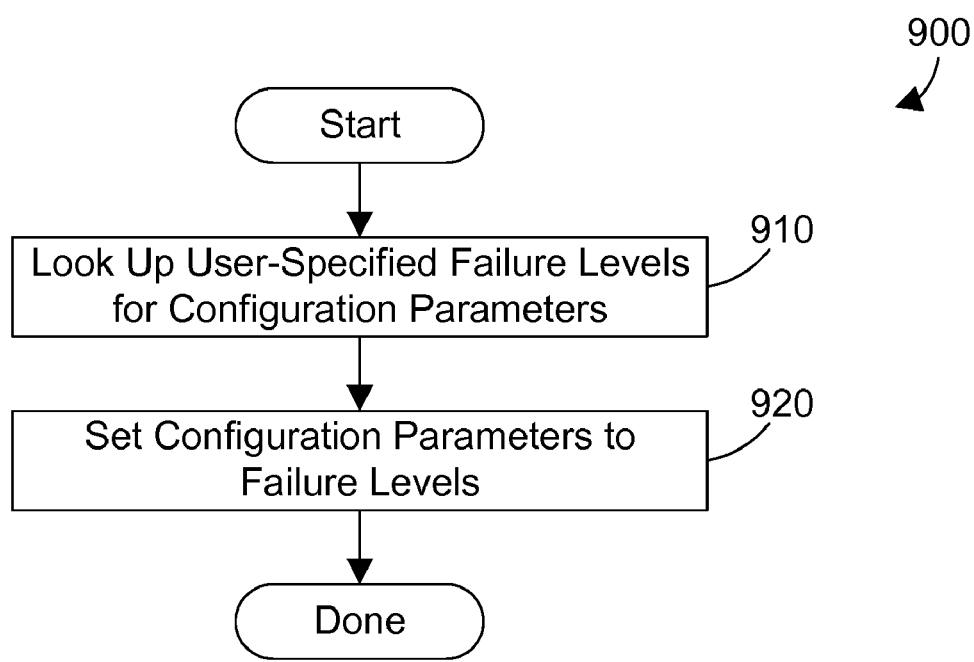
FIG. 9 is a flow diagram of a method in accordance with the preferred embodiments to use failure levels for configuration parameters that were set by a user, and setting the configuration parameters for a server to the failure levels when a failure occurs.
Figures 10, 11:
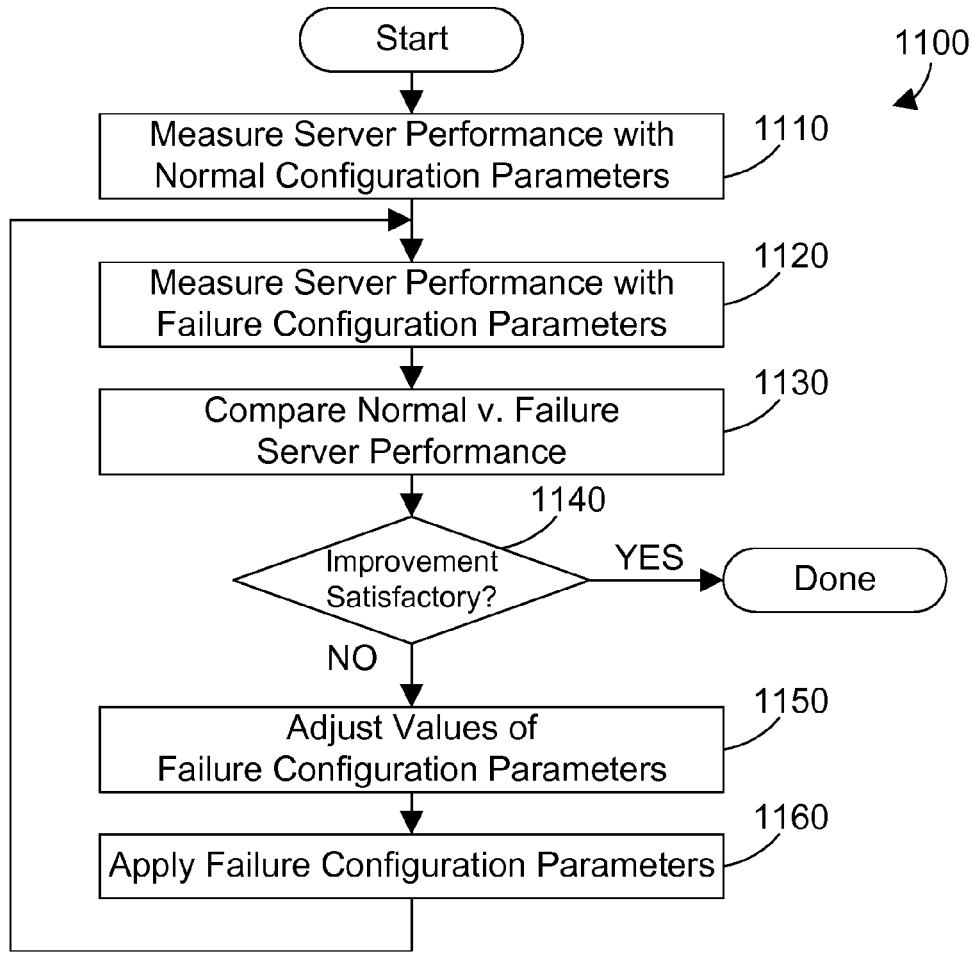
FIG. 10 is a table showing one specific example of user-specified failure levels for configuration parameters in accordance with method 900 in FIG. 9.
FIG. 11 is a flow diagram of a method for measuring server performance before and after autonomic adjustment of a server's configuration parameters in accordance with the preferred embodiments.

A second method for defining failure levels for configuration parameters allows a user to specify the failure levels. These user-specified failure levels may then be retrieved when a failure occurs. Referring to FIG. 9, a method 900 begins by looking up user-specified failure levels for the configuration parameters (step 910). The configuration parameters are then set to the failure levels (step 920). FIG. 10 shows a table 1000 that contains three columns, one that contains normal levels for the configuration parameters, a second that contains one set of failure levels in the event of one failed server, and a third that contains another set of failure levels in the event of two failed servers. These levels are preferably specified by a user. Note that a user may use any suitable tool to aid in the determination of appropriate levels for the configuration parameters. When a user explicitly specifies normal and failure levels for the configuration parameters, as shown in FIG. 10, the autonomic configuration parameters adjustment mechanism need only set the configuration parameters to the levels in table 1000 according to whether the server is operating in a normal mode (with no failed servers), in a mode with one failed server, or in a mode with two failed servers.

As shown in FIGS. 3-5, the preferred embodiments include a performance measurement mechanism 336. This performance measurement mechanism 336 allows the autonomic configuration parameters adjustment mechanism 334 to determine whether the adjustments had the desired effect of increasing performance in the server. Referring now to FIG. 11, a method 1100 begins by measuring server performance with configuration parameters at normal levels (step 1110). In the most preferred implementation, the server performance with configuration parameters at normal levels is measured just after a failure in one of the servers is detected. This allows the measurement in step 1110 to represent the performance with the normal configuration parameters even though a failure has occurred. After the autonomic configuration parameters adjustment mechanism 334 has set the configuration parameters to failure levels, the performance is measured again (step 1120). The performance of the two are then compared (step 1130). If the improvement is satisfactory (step 1140=YES), method 1100 is done. If the improvement is not satisfactory (step 1140=NO), the failure values are adjusted (step 1150) and applied (step 1160). Control then passes to step 1120, and method 1100 continues. The performance measurement mechanism 336 thus allows a determination of whether or not the failure levels for the configuration parameters created a desired increase in performance.

One suitable way for the performance measurement mechanism 336 to measure performance of the server is to measure servlet response times. Servlet response time is the time required to execute a servlet, which is a program on the server that may be invoked by a client. Of course, other suitable metrics could be used to measure performance of the server within the scope of the preferred embodiments.

The preferred embodiments enhance the ability of servers to handle failures by detecting a failure of one of the servers, signaling to the remaining servers that the failure occurred, with one or more of the remaining servers autonomically adjusting one or more of their configuration parameters to improve performance under the increased load caused by the failure. Once a server recovers, one or more servers may autonomically adjust their configuration parameters back to normal levels. In addition, a performance measurement mechanism allows determining whether the failure levels of the configuration parameters increased system performance as expected.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. A server computer system comprising:
   at least one processor;
   a memory coupled to the at least one processor;
   at least one configuration parameter that may be set to different values according to desired performance of the server computer system;
   an autonomic configuration parameters adjustment mechanism that adjusts the at least one configuration parameter when the server computer system receives a message indicating failure of a different server computer system; and
   a performance measurement mechanism that measures performance of the server computer system before the adjustment of the at least one configuration parameter, that measures performance of the server computer system after the adjustment of the at least one configuration parameter, and that determines whether the adjustment of the at least one configuration parameter improved performance of the server computer system.

2. The server computer system of claim 1 wherein the at least one configuration parameter includes a maximum number of database connections.

3. The server computer system of claim 1 wherein the at least one configuration parameter includes a maximum number of prepared statements in a cache.

4. The server computer system of claim 1 wherein the at least one configuration parameter includes a maximum number of threads.

5. A networked computer system comprising:
   a plurality of server computer systems;
   a load balancer that routes requests to the plurality of computer systems, the load balancer comprising:
      a failure detection mechanism that detects when one of the plurality of server computer systems fails;
      a failure notification mechanism that sends a message to at least one of the plurality of server computer systems when the failure detection mechanism detects failure of the one server computer system;
   wherein at least one of the plurality of server computer systems further comprises an autonomic configuration parameters adjustment mechanism that adjusts at least one configuration parameter when the message is received from the failure notification mechanism indicating failure of the one server computer system; and
   wherein at least one of the plurality of server computer systems further comprises a performance measurement mechanism that measures performance of the at least one server computer system before the adjustment of the at least one configuration parameter, that measures performance of the at least one server computer system after the adjustment of the at least one configuration parameter, and that determines whether the adjustment of the at least one configuration parameter improved performance of the at least one server computer system.

6. The networked computer system of claim 5 wherein the at least one configuration parameter includes a maximum number of database connections.

7. The networked computer system of claim 5 wherein the at least one configuration parameter includes a maximum number of prepared statements in a cache.

8. The networked computer system of claim 5 wherein the at least one configuration parameter includes a maximum number of threads.

9. The networked computer system of claim 5 wherein the message indicates how much additional work may be expected due to the failure of the one server computer system.

10. The networked computer system of claim 5 wherein the load balancer detects a failure recovery, and sends a message to at least one of the plurality of server computer systems when the load balancer detects the failure recovery.

11. The networked computer system of claim 10 wherein the at least one of the plurality of server computer systems, in response to the message from the load balancer indicating a failure recovery, adjusts the at least one configuration parameter to normal levels.

12. A program product comprising:
   an autonomic configuration parameters adjustment mechanism that adjusts at least one configuration parameter in a server computer system when the server computer system receives a message indicating failure of a different server computer system;
   a performance measurement mechanism that measures performance of the server computer system before the adjustment of the at least one configuration parameter, that measures performance of the server computer system after the adjustment of the at least one configuration parameter, and that determines whether the adjustment of the at least one configuration parameter improved performance of the server computer system; and
   a recordable computer-readable storage signal bearing media bearing the autonomic configuration parameters adjustment mechanism and the performance measurement mechanism.

13. The program product of claim 12 wherein the at least one configuration parameter includes a maximum number of database connections.

14. The program product of claim 12 wherein the at least one configuration parameter includes a maximum number of prepared statements in a cache.

15. The program product of claim 12 wherein the at least one configuration parameter includes a maximum number of threads.

16. The program product of claim 12 wherein the message indicates how much additional work may be expected due to the failure of the one server computer system.

* * * * *